May 29, 1945. C. M. STANLEY 2,377,189
CONTINUOUS INDUSTRIAL FILTER
Filed Oct. 5, 1943 3 Sheets-Sheet 1
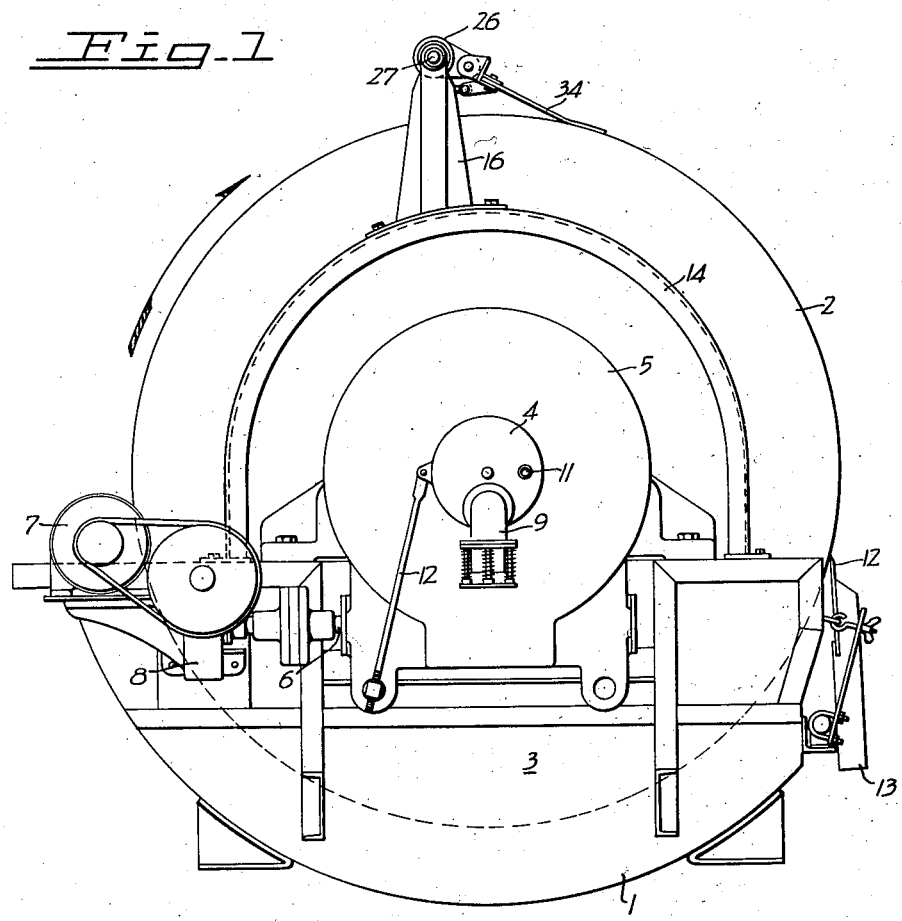
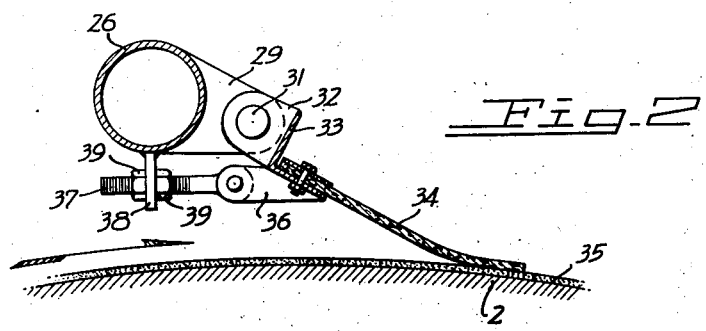
INVENTOR
CARROLL M. STANLEY
BY
ATTORNEY May 29, 1945.  C. M. STANLEY  2,377,189
CONTINUOUS INDUSTRIAL FILTER
Filed Oct. 5, 1943  3 Sheets-Sheet 2

INVENTOR
CARROLL M. STANLEY
BY
ATTORNEY

May 29, 1945.  C. M. STANLEY  2,377,189
CONTINUOUS INDUSTRIAL FILTER
Filed Oct. 5, 1943  3 Sheets-Sheet 3
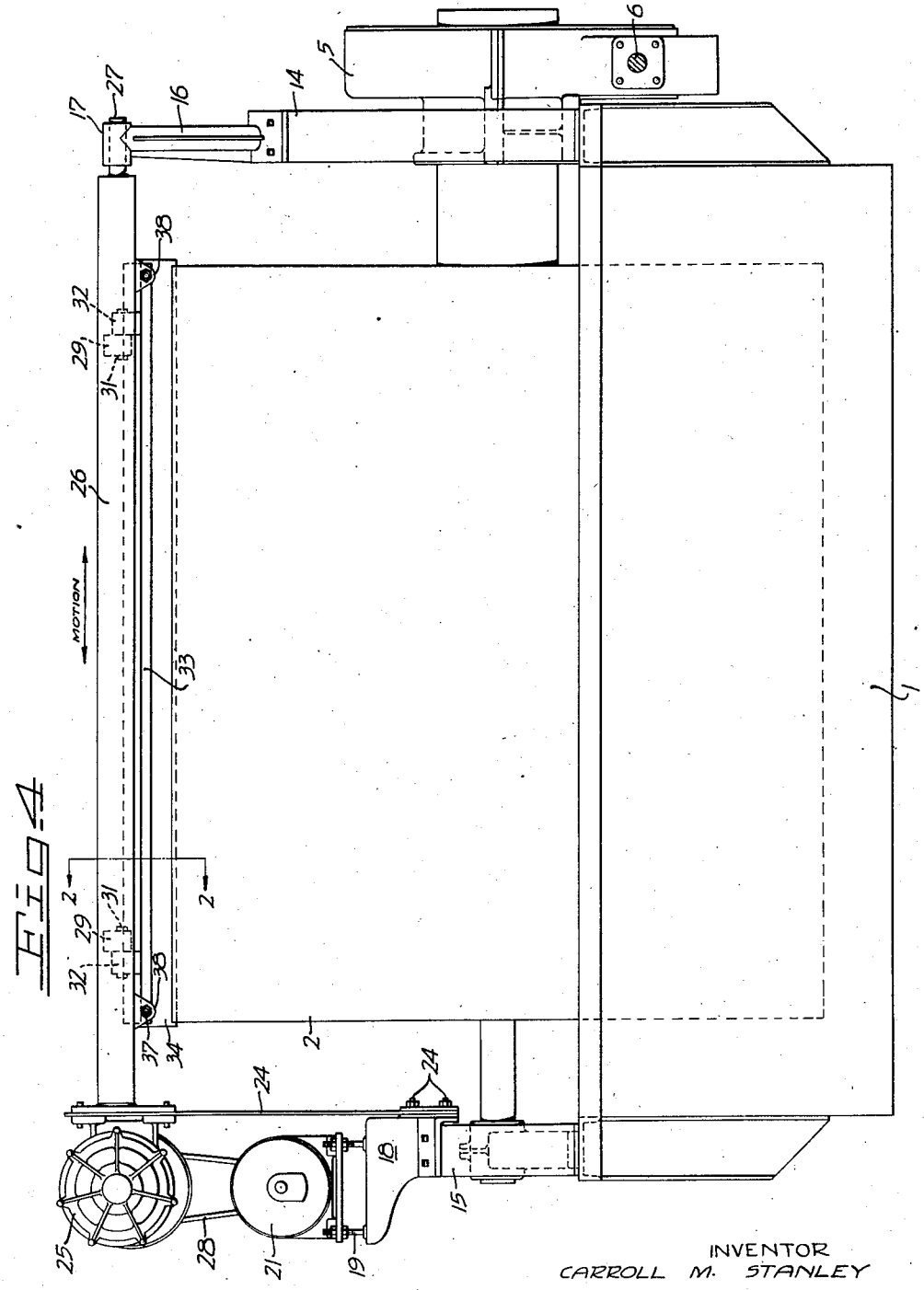
INVENTOR
CARROLL M. STANLEY
BY
ATTORNEY Patented May 29, 1945

2,377,189

UNITED STATES PATENT OFFICE 2,377,189

CONTINUOUS INDUSTRIAL FILTER

Carroll M. Stanley, Summit, N. J., assignor to Oliver United Filters Incorporated, Oakland, Calif., a corporation of Nevada Application October 5, 1943, Serial No. 504,993

13 Claims. (Cl. 210—199)

This invention relates in general to continuous industrial filters, and more particularly to a filter of this type provided with a moisture content reducing attachment or puddler.

Although basically the function of all filters is to effect a separation of solids and liquids, some filters are particularly designed to produce a cake having a lower moisture content than can normally be obtained by merely resorting to the application of a differential filtering pressure. The reason for this is that in some instances, the cake discharged from the filter is immediately passed through a dryer to free it of substantially all moisture, and the less moisture that is present in the cake discharged from the filter, the less load will be placed on the dryer. From a practical standpoint, however, the application of attachments to a filter for producing a cake having a moisture content lower than that normally obtained, is justified only if the cost involved in resorting to this expedient is less than the cost involved in reducing the additional moisture content by means of the dryer.

The solids here being dealt with are of a thixotropic character wherein moisture is held within its interstitial spaces by adhesion or capillary attraction, and wherein at least a part of this moisture can be brought to the surface by vibrating the solids so as to cause a rearrangement of the solid particles, and thereby effect a decrease of the adhesion or capillary attraction between the entrained moisture and the solid particles.

While puddlers for this purpose are old in connection with continuous filters, all of them, in so far as I know, vibrate the cake in a direction perpendicular to its face.

In general, the object of this invention is the provision of a filter cake puddler wherein a cake engaging member is caused to vibrate in a direction transverse to the direction of travel of the cake, and in the plane of the upper surface thereof.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Figure 1 is a valve-end elevation of a continuous rotary drum filter embodying the objects of my invention.

Figure 2 is an enlarged fragmentary section taken on the section line 2—2 of Figure 4.

Figure 4 is a side elevation of the filter shown in Figure 1 as viewed on the rising side of the drum.

Figure 3:
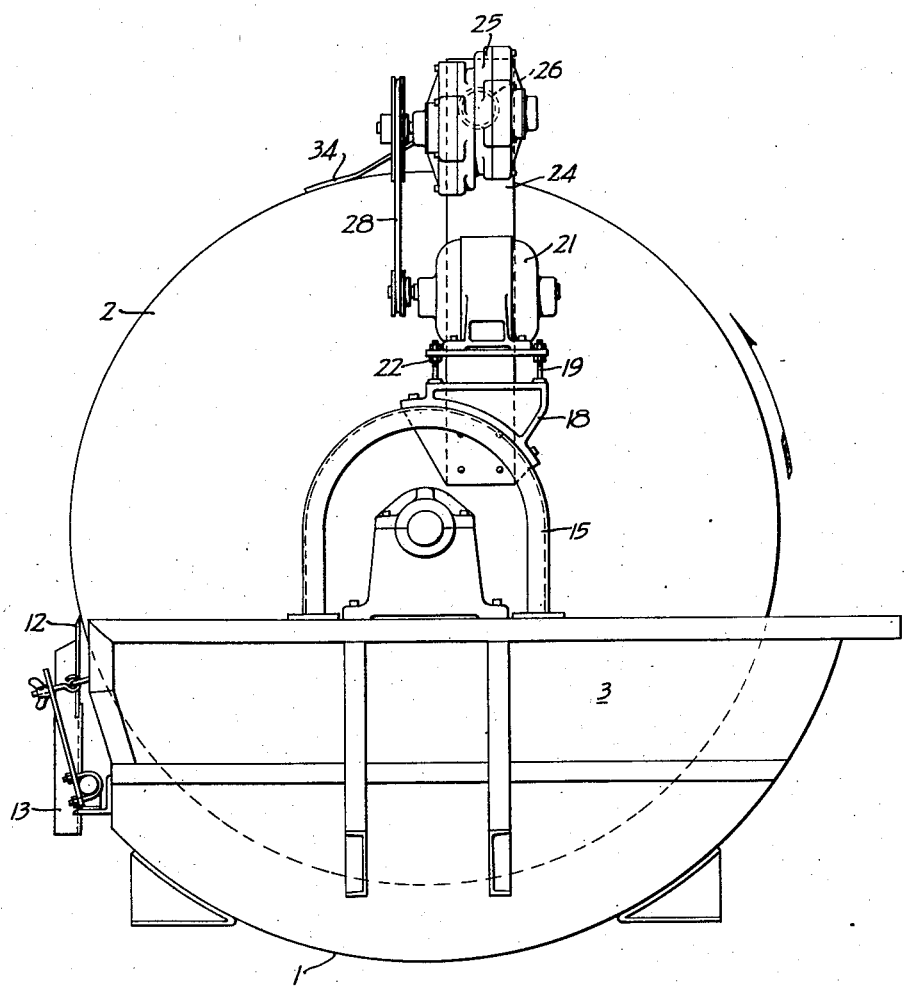
Figure 3 is an elevation of the filter shown in Figure 1, illustrating the end opposite that shown in Figure 1.

As shown in these figures, the objects of my invention have been embodied in a continuous rotary drum filter such as manufactured by Oliver United Filters Incorporated. In accordance with standard practice, this type of filter comprises a tank 1, within which is arranged to rotate a filter drum 2, supported at either end by trunnions journaled in bearings associated with the tank heads 3. The peripheral surface of the drum is divided by division strips into a plurality of longitudinally extending filtrate compartments communicating through suitable conduits, with an automatic valve 4 associated with the end of one of the drum trunnions. Rotation is imparted to the drum through a ring gear carried by one of the drum trunnions, and disposed within the gear housing 5. Meshed with this ring gear is a worm gear carried by the shaft 6, driven by a motor 7 through a speed reducer 8. The automatic valve 4 may be of the type disclosed in the Oliver Patent No. 919,628, of April 27, 1909, and is provided with a vacuum connection 9, and with a blow-back connection 11, and with suitable bridges, whereby any one of the filtrate compartments formed on the periphery of the drum may be successively subjected to a vacuum or reverse pressure. For the purpose of adjusting the entire cycle of operation, the valve 4 may be rotated through a pre-determined angle and held at any desired angle by an adjusting rod 12. Mounted on the tank 1, adjacent the drum 2 on the descending side thereof, is a scraper or doctor 12, and a cake deflector 13.

As already stated, the filter above described is of standard construction, operating in accordance with standard practice. The pulp or slurry to be filtered is continuously fed to the tank 1, in which the drum 2 continuously rotates. As each filtrate compartment of the drum is submerged in the pulp or slurry, it is subjected by means of the automatic valve 4 to a differential filtering pressure, resulting in the deposition on the filter medium carried by the drum of a deposit of solids. As each section emerges from the tank, the cake carried thereon may be subjected to a displacement wash, and partially dried by pulling air, either hot or cold, therethrough by means of the automatic valve. Upon reaching the doctor 12, a reverse pressure or blow-back is applied to the cake in order to aid the doctor in discharging the cake from the filter drum.

For the purpose of further reducing the moisture content of the cake deposited on and carried by the filter drum 2 prior to the removal of the cake by the doctor 12, the filter is provided with a puddling device comprising an arcuate bracket 14, secured to the tank head 3 on the valve end of the filter drum, and an arcuate bracket 15, secured to the tank head 3 of the opposite end of the tank. Bolted to the bracket 14 is a pedestal 16, provided with a bearing sleeve 17. Secured to the opposed bracket 15 is a motor mounting 18, provided with upstanding bolts 19, and carried by these bolts is an electric motor 21. The height of the motor with respect to the mounting 18 can be controlled by adjusting the nuts 22 threaded on the bolts 19. Secured to the inner face of the motor mounting 18 by bolts 23 is a leaf spring 24. Mounted on the upper exterior face of the leaf spring 24 is a vibrator 25, which may be of any standard construction, such as for example the vibrator commercially known as the "Ajax-Shaler" Shaker, illustrated in the bulletin No. 24–C of the Ajax Flexible Coupling Company, of Westfield, New York. Vibrators of this type consist basically of two offset weights mounted on shafts geared together, so that when one shaft is rotated, the other must also rotate at the same speed, but in the opposite direction. Twice in each revolution the two weights are pulled in the same direction, and twice they are opposed, with the result that the centrifugal forces generated are balanced just half of each cycle. When the weights are rotated, the housing in which they are mounted travels back and forth in the plane in which the weights pass each other. Secured to the inner face of the leaf spring 24, and extending over the face of the filter drum 2, is a tubular beam 26, the free end of which is provided with a stud 27, slidably engaged within the sleeve 17 formed on the pedestal 16. The vibrator 25 is driven by the motor 21 by a belt drive 28, and is so positioned on the leaf spring 24 that it vibrates the beam 26 in a direction only parallel to the axis of the beam.

Welded to the beam 26 is a plurality of hinge-locks 29, and hinged to these locks by means of pintles 31 are lugs 32 welded to an angle bar 33 overlying the face of the filter drum. Clamped to the angle bar 33 is a rubber strip 34, the free end of which is arranged to contact the layer 35 of cake deposited and carried on the filter drum 2. Welded along the lower face of the angle bar 33 is a plurality of lugs 36, to which is pivoted the bolt 37 extending through ears 38 welded to the lower side of the beam 26. Threaded to each of the bolts 37 on either side of the ears 38 are nuts 39, by means of which the position of the panel or strip 34 with respect to the surface of the drum 2 may be adjusted and locked. Changing the angular position of the strip 34 with respect to the drum, of course, changes the pressure between these two members.

Since the beam 26 is vibrated by the vibrator 25 along its own axis, and since the strip 34 is carried by the beam 26, the strip 34 will also be vibrated longitudinally of itself. The vibrator 25 should be so adjusted that the amplitude of the vibrations produced by it should be within a range of 1/8 to 3/8 inch. Too great an amplitude of vibration is objectionable for the reason that the strip 34 being always in contact with the cake 35, is likely to tear the cake. The strip 34, in addition to serving as a medium for imparting vibrations to the cake 35, also serves the purpose of closing or healing any cracks which may have formed in the cake due to its contraction upon being partially dried. To perform this additional function, the amplitude of the vibrations to which the strip 34 is subjected should not be too short. It should be particularly noted that the strip 34 is always in contact with the cake, vibrates in the plane of the cake, and in a direction perpendicular to the direction of its travel. Although the strip 34 is preferably made of rubber or other equivalent material, so as to conform in some measure to any appreciable irregularities occurring in the surface of the cake, it can be made of a rigid material. If necessary, the upper face of that portion of the strip 34 contacting the cake may be weighted, in order to create a positive pressure between these two members. Viewed from the valve end of the filter, as shown in Figure 1, the vibrator strip 34 has been located about the one o'clock position. There is, however, nothing critical about this position, for depending upon the nature of the cake being handled, it may be placed anywhere from the ten o'clock position to the two o'clock position. Preferably the automatic valve 4 is so constructed and adjusted so as to relieve the vacuum on each of the filtrate compartments as it passes beneath the strip 34, vacuum thereafter being applied until the discharge station has been reached, at which point the cake is subjected to a reverse or blow-back pressure. In some cases, it may be desirable to provide the filter with a pair of spaced vibrating devices, applying vacuum to each compartment after it has passed each of the vibrating devices, so as to withdraw the moisture which has been puddled therefrom.

From a practical standpoint, one decided advantage of my vibrator is that only very little power is required to operate it, a 1/4 H. P. motor being ample for most filters.

In the appended claims, the term "panel" without further qualification is used to designate either a panel of flexible material such as rubber, leather or the like, or a panel of more rigid material such as wood or metal.

I claim:

1. A device for puddling the cake formed and carried on an endless travelling filtering medium comprising: a panel disposed across said filtering medium and arranged to have a substantial portion of its lower surface contact the cake carried thereon; and means for vibrating said panel in its own plane and substantially at right angles to the direction of travel of said filter medium.

2. A device for puddling the cake formed and carried on a travelling endless filtering medium comprising: a panel of flexible material disposed across said filtering medium and arranged to have a substantial portion of its lower surface contact the cake carried thereon; and means for vibrating said panel in its own plane and substantially at right angles to the direction of travel of said filter medium.

3. A device for puddling the cake formed and carried on an endless travelling filtering medium comprising: a panel transversely overlying said filtering medium and arranged for contact with the cake carried thereon over a substantial portion of its surface; means for vibrating said panel in its own plane and substantially at right angles to the direction of travel of said filter medium; and means for adjusting the pressure between said panel and said cake.

4. A device for puddling the cake formed and carried on an endless travelling filtering medium comprising: a panel transversely overlying a substantial portion of said filtering medium and converging therewith in the direction of its travel so as to contact the cake carried thereon; and means for vibrating said panel in its own plane and substantially at right angles to the direction of travel of said filtering medium.

5. A device for puddling the cake formed and carried on an endless travelling filtering medium comprising: a panel transversely overlying substantial area of said filtering medium and converging therewith in the direction of its travel so as to contact the cake carried thereon; means for vibrating said panel in its own plane and substantially at right angles to the direction of travel of said filtering medium; and means adjusting the angle of convergence between said panel and said filtering medium.

6. In a continuous filter including a filter drum arranged to rotate in a filter tank, a puddler for puddling the cake formed and carried on said filter drum comprising: a panel supported by said filter tank transversely of said filter drum and arranged to contact substantial area of the cake carried thereon; and means supported by said filter tank for vibrating said panel in its own plane and substantially at right angles to the direction of travel of said filter drum.

7. In a continuous filter including a filter drum arranged to rotate in a filter tank, a puddler for puddling the cake formed and carried on said filter drum comprising: a beam supported by said tank over said filter drum; a paned suspended from said beam in contact with said filter drum; and means for vibrating said beam in a line coincident with its axis.

8. In a continuous filter including a filter drum arranged to rotate in a filter tank, a puddler for puddling the cake formed and carried on said filter drum comprising: a beam resiliently supported by said tank over said filter drum; a panel suspended from said beam in contact with said filter drum; and means for vibrating said beam in a line coincident with its axis.

9. In a continuous filter including a filter drum arranged to rotate in a filter tank, a puddler for puddling the cake formed and carried on said filter drum comprising: a spring leaf carried by one end of said tank; a beam supported at one end by said spring leaf over said filter drum; a panel suspended from said beam in contact with said filter drum; and means for vibrating said beam along its own axis.

10. In a continuous filter including a filter drum arranged to rotate in a filter tank, a puddler for puddling the cake formed and carried on said filter drum comprising: a spring leaf carried by one end of said tank; a sleeve carried by the opposite end of said tank in alignment with the free end of said spring leaf; a beam slidably supported at one end by said sleeve, and secured at its other end to said spring leaf, said beam being transversely disposed over said drum; a panel suspended from said beam in contact with said filter drum; and means for vibrating said beam along its own axis.

11. In a continuous filter including a filter drum arranged to rotate in a filter tank; a spring leaf carried by one end of said tank; a beam supported at one end by said spring leaf transversely over said filter drum; a panel suspended from said beam in converging contact with said filter drum in the direction of travel of said drum; and means for vibrating said beam along its own axis.

12. In a continuous filter including a filter drum arranged to rotate in a filter tank; a spring leaf carried by one end of said tank; a beam supported at one end by said spring leaf transversely over said filter drum; a panel suspended from said beam in converging contact with said filter drum in the direction of travel of said drum; means for vibrating said beam along its own axis; and means for adjusting the angle of convergence between said panel and said drum.

13. In a continuous filter including a filter drum arranged to rotate in a filter tank; a spring leaf carried by one end of said tank; an arm parallel with said spring leaf carried by the opposed end of said tank; a beam supported at one end from said arm and at its opposite end from said spring leaf transversely over said filter drum; a panel hinged to said beam so as to converge in contact with said drum in the direction of travel of said drum; means for adjusting the angular position of said panel and means for vibrating said beam.

CARROLL M. STANLEY.